US011143291B1

(12) United States Patent
Park et al.

(10) Patent No.: US 11,143,291 B1
(45) Date of Patent: Oct. 12, 2021

(54) APPARATUS AND METHOD FOR CONTROLLING TRANSMISSION OF VEHICLE AND VEHICLE SYSTEM

(71) Applicants: Hyundai Motor Company, Seoul (KR); Kia Motors Corporation, Seoul (KR)

(72) Inventors: Kwang Hee Park, Suwon-si (KR); Byeong Wook Jeon, Seoul (KR); Dong Hoon Jeong, Hwaseong-si (KR); Jae Chang Kook, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/075,488

(22) Filed: Oct. 20, 2020

(30) Foreign Application Priority Data

Jun. 22, 2020 (KR) .......................... 10-2020-0075884

(51) Int. Cl.
*F16H 61/02* (2006.01)
*F16H 59/44* (2006.01)
*F16H 59/68* (2006.01)

(52) U.S. Cl.
CPC .............. *F16H 59/44* (2013.01); *F16H 59/68* (2013.01); *F16H 61/0213* (2013.01); *F16H 2061/0218* (2013.01)

(58) Field of Classification Search
CPC .......... F16H 59/44; F16H 59/68; F16H 59/46; F16H 61/0213; F16H 61/08; F16H 2061/0218; F16H 2061/022; F16H 2061/0234; F16H 2302/02; F16H 2302/06; F16H 2306/20; F16H 2306/30
See application file for complete search history.

(56) References Cited

U.S. PATENT DOCUMENTS

| 2015/0149052 | A1* | 5/2015 | Jeong | .............. F16H 61/0204 701/58 |
| 2018/0201262 | A1* | 7/2018 | Yoon | .................. B60W 10/10 |
| 2021/0016775 | A1* | 1/2021 | Hayashi | .................. F16H 59/44 |
| 2021/0088129 | A1* | 3/2021 | Ooshima | .................. F16H 59/14 |

FOREIGN PATENT DOCUMENTS

KR 10-2020-0070486 A 6/2020

* cited by examiner

*Primary Examiner* — Edwin A Young
(74) *Attorney, Agent, or Firm* — Morgan, Lewis & Bockius LLP (57) ABSTRACT

An apparatus for controlling transmission of vehicle may include a determining device to determine whether to perform deceleration control, based on the vehicle and a target for the deceleration control in front of the vehicle, a calculating device to sub-divide a distance between a current position of the vehicle and the target for the deceleration control into sections, and calculate a target distance for each section of the plurality of sections and a target speed of the section, based on a current speed of the vehicle and the distance between the current position of the vehicle and the target for the deceleration control, a gearshifting stage deciding device to determine a gearshifting stage for each section of the plurality of sections, based on the calculated target speed and the calculated target distance for the section by configuring a deceleration profile for each gearshifting stage, and a control device to control the transmission for each section based on the gearshifting stage for the section.

20 Claims, 7 Drawing Sheets

Fig.7

APPARATUS AND METHOD FOR CONTROLLING TRANSMISSION OF VEHICLE AND VEHICLE SYSTEM

CROSS-REFERENCE TO RELATED APPLICATION

The present application claims priority to Korean Patent Application No. 10-2020-0075884, filed on Jun. 22, 2020, the entire contents of which is incorporated herein for all purposes by this reference.

BACKGROUND OF THE INVENTION

Field of the Invention

The present invention relates to an apparatus and a method for controlling a transmission of a vehicle, and a vehicle system, and more particularly, to a technology of controlling a gearshifting stage based on a movement distance of a front vehicle when controlling a transmission linked with the deceleration of the front vehicle.

Description of Related Art

In general, an automatic transmission determines a gearshifting stage based on a shift pattern, in which a gear shifting area is previously set based on the relationship between an opening (APS) of an accelerator pedal and a vehicle speed.

In the case of conventional gear shifting (APS OFF & vehicle deceleration) before the vehicle stops based on the shift pattern, downshift occurs only when a current vehicle speed is decreased to a specific vehicle speed or less. However, when an engine brake at a current gearshifting stage or more is additional necessary, the downshift to a lower gearshifting stage is failed. Furthermore, when the brake is manipulated for the downshift, the deceleration may be excessively performed.

In particular, conventionally, the transmission control based on the shift pattern is performed without considering a road condition such as the limit speed of a road or the gradient (slop) of the road. Accordingly, a sudden deceleration may be performed before the target position (the position of a speed camera) or an acceleration is performed to follow the target speed after excessive deceleration is performed from an initial stage, increasing the sense of incompatibility.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling a transmission of a vehicle, configured for sub-dividing a distance from a current position to a target position into a plurality of sections, determining a target position for each section of the plurality of sections and a target speed for each section of the plurality of sections, and controlling the transmission according to a speed profile resulting from the determination result, a vehicle system.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, an apparatus of controlling a transmission of a vehicle may include a determining device to determine whether to perform deceleration control, based on the vehicle and a target for the deceleration control in front of the vehicle, when coasting of the vehicle is started, a calculating device to sub-divide a distance between a current position of the vehicle and the target for the deceleration control into a plurality of sections, and determine a target distance for each section of the plurality of sections and a target speed of the section, based on a current speed of the vehicle and the distance between the current position of the vehicle and the target for the deceleration control, when the deceleration control is determined to be performed, a gearshifting stage deciding device to determine a gearshifting stage for each section of the plurality of sections, based on the determined target speed for the section and the determined target distance for the section by configuring a deceleration profile for each gearshifting stage, and a control device to control the transmission for each section based on the gearshifting stage for the section.

According to various exemplary embodiments of the present invention, the determining device may determine to perform the deceleration control when an acceleration of the vehicle satisfies a reference condition.

According to various exemplary embodiments of the present invention, the calculating device may sub-divide the distance between the current position of the vehicle and the target for the deceleration control into the plurality of sections, by applying a preset ratio to the distance.

According to various exemplary embodiments of the present invention, the determining device may determine a first target speed at a point through which the vehicle passes through a first section of the plurality of sections, determines a second target speed at a point through which the vehicle passes through a second section adjacent to the first section, and determine a final target speed at a position of the target for the deceleration control.

According to various exemplary embodiments of the present invention, the calculating device may determine the first target speed according to a speed variation between the current speed of the vehicle and the final target speed, and the current speed of the vehicle.

According to various exemplary embodiments of the present invention, the calculating device may determine the second target speed according to a speed variation between the first target speed and the final target speed, and the first target speed.

According to various exemplary embodiments of the present invention, the determining device may determine whether the vehicle passes through each of the plurality of sections.

According to various exemplary embodiments of the present invention, the gearshifting stage deciding device may determine, as a first section gearshifting stage, a gearshifting stage to converge the first target speed at a position when the vehicle passes through the first section, in the deceleration profile for each gearshifting stage.

According to various exemplary embodiments of the present invention, the gearshifting stage deciding device may determine, as a second section gearshifting stage, a gearshifting stage to converge the second target speed at a position when the vehicle passes through the second section, in the deceleration profile for each gearshifting stage, after the vehicle passes through the first section.

According to various exemplary embodiments of the present invention, the gearshifting stage deciding device may determine, as a second section gearshifting stage, a gearshifting stage to converge the second target speed at a position when the vehicle passes through the second section, in the deceleration profile for each gearshifting stage, after the vehicle passes through the first section.

According to various exemplary embodiments of the present invention, the calculating device may determine the final target speed according to a speed of the target for the deceleration control and a position of the target for the deceleration control, when the deceleration control is performed.

According to various exemplary embodiments of the present invention, the apparatus may further include a sensor to collect information on the target for the deceleration control.

According to various aspects of the present invention, a method for controlling a transmission of a vehicle may include determining whether to perform deceleration control, based on the vehicle and a target for the deceleration control in front of the vehicle, when coasting of the vehicle is started, sub-dividing a distance between a current position of the vehicle and the target for the deceleration control into a plurality of sections, and determining a target distance for each section of the plurality of sections and a target speed of the section, based on a current speed of the vehicle and the distance between the current position of the vehicle and the target for the deceleration control, when the deceleration control is determined to be performed, determining a gearshifting stage for each section of the plurality of sections, based on the determined target speed for the section and the determined target distance for the section by configuring a deceleration profile for each gearshifting stage, and controlling the transmission for each section based on the gearshifting stage for the section.

According to various exemplary embodiments of the present invention, the determining of whether to perform the deceleration control may include determining to perform the deceleration control when the current speed of the vehicle satisfies a reference condition.

According to various exemplary embodiments of the present invention, the determining of the target distance for each section of the plurality of sections and the target speed of the section may include sub-dividing the distance between the current position of the vehicle and the target for the deceleration control into the plurality of sections, by applying a preset ratio to the distance.

According to various exemplary embodiments of the present invention, the determining of the target distance for each section of the plurality of sections and the target speed of the section may include determining a first target speed at a point through which the vehicle passes through a first section of the plurality of sections, determining a second target speed at a point through which the vehicle passes through a second section adjacent to the first section, and determining a final target speed at a position of the target for the deceleration control.

According to various exemplary embodiments of the present invention, the determining of the final target speed may include determining the first target speed according to a speed variation between the current speed of the vehicle and the final target speed, and the current speed of the vehicle, and determining the second target speed according to a speed variation between the first target speed and the final target speed, and the first target speed.

According to various exemplary embodiments of the present invention, the determining of the gearshifting stage for each section may include determining, as a first section gearshifting stage, a gearshifting stage to converge the first target speed at a position in the entrance into the first section, in the deceleration profile for each gearshifting stage.

According to various exemplary embodiments of the present invention, the determining of the gearshifting stage for each section may further include determining, as a second section gearshifting stage, a gearshifting stage to converge the second target speed at a position when the vehicle passes through the second section, in the deceleration profile for each gearshifting stage, after passing through the first section.

According to various exemplary embodiments of the present invention, the determining of the gearshifting stage for each section may further include determining, as a final gearshifting stage, a gearshifting stage to converge the final target speed at the position in passing through the second section, in the deceleration profile for each gearshifting stage, after passing through the second section.

According to various aspects of the present invention, a vehicle system may include a navigation system to provide information on a road, and a vehicle transmission controlling apparatus to: sub-divide a distance between a current position of a vehicle and a target for the deceleration control, when the target for the deceleration control is confirmed as being present on a front road by the navigation system, determine a target distance for each section of the plurality of sections and a target speed for the section based on a current speed of the vehicle and the distance between the current position of the vehicle and the target for the deceleration control, determine a gearshifting stage for each section of the plurality of sections, based on the determined target speed for the section and the determined target distance for the section by configuring a deceleration profile for each gearshifting stage, and control a transmission of the vehicle based on the determined gearshifting stage.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

Furthermore, in the following description of components according to various exemplary embodiments of the present invention, the terms "'first", "second", 'A', 'B', '(a)', and '(b)' may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described with reference to FIGS. 1 to 7.

Figure 1:
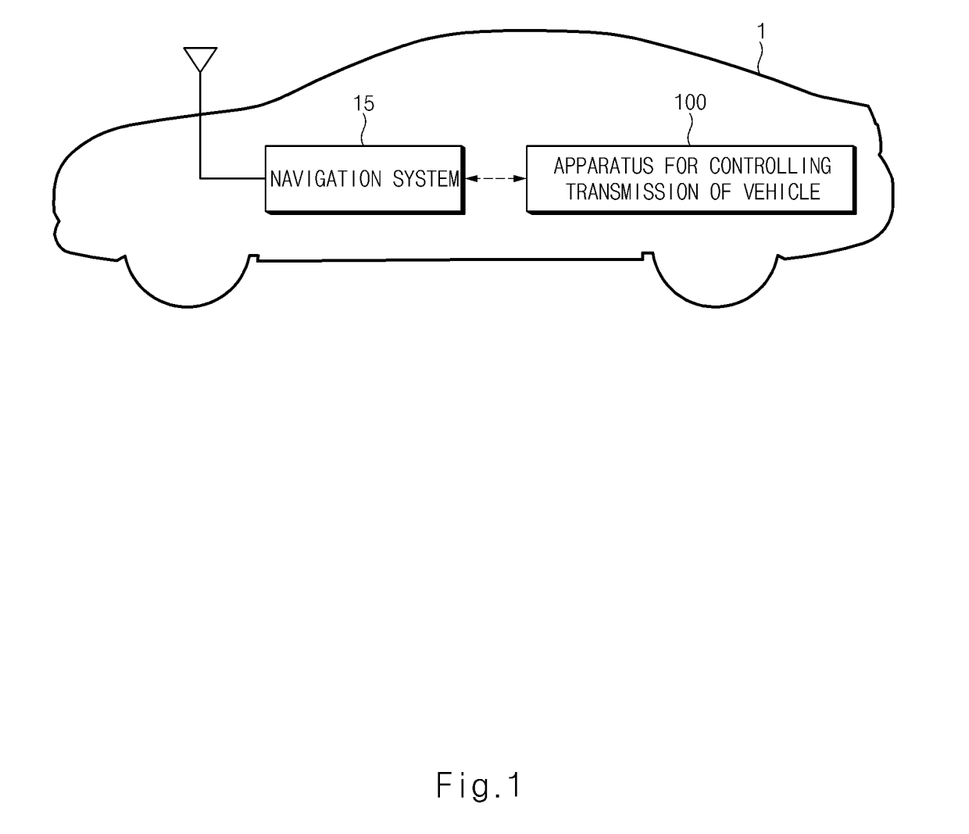
FIG. 1 is a view exemplarily illustrating a system employing an apparatus of controlling a transmission of a vehicle, according to various exemplary embodiments of the present invention.

FIG. 1 is a view exemplarily illustrating a system employing an apparatus (vehicle transmission controlling apparatus) for controlling a transmission of a vehicle, according to various exemplary embodiments of the present invention.

Referring to FIG. 1, according to various exemplary embodiments of the present invention, the vehicle transmission controlling apparatus 100 may be implemented inside the vehicle. Furthermore, the vehicle transmission controlling apparatus 100 may be formed integrally with the internal control units of the vehicle or may be implemented separately from the internal control units of the vehicle to be connected to the internal control units of the vehicle through a separate connector.

Referring to FIG. 1, coasting is started as an accelerator (hereinafter, referred to as "accel") OFF state or a brake OFF state comes, and deceleration control may be performed when a target, such as a front speed camera or a front vehicle, for the deceleration control is detected.

Furthermore, the vehicle transmission controlling apparatus 100 may control the transmission before arriving at a detecting section of the speed camera, based on information on a front road and driving state information related to the vehicle, which are received from a navigation system 15. Furthermore, the vehicle transmission controlling apparatus 100 may obtain information on a current position of the vehicle 10 and the state information related to the front road from the navigation system 15 or a sensor. Furthermore, the vehicle transmission controlling apparatus 100 may detect whether the front vehicle is present within a front reference range using a sensor such as a radar.

Accordingly, the vehicle transmission controlling apparatus 100 may perform deceleration control based on the front vehicle or deceleration control based on a target point, when the target, such as the front vehicle or the speed camera, for the deceleration control is detected as being in front. The deceleration control based on the front vehicle is a manner of performing the deceleration control by following the speed of the front vehicle, and the deceleration control based on the target speed is a manner of performing the deceleration control based on a target speed at the target point. In the instant case, the target point may be the position of the speed camera, and a limit speed based on the speed camera may be the target speed.

Figure 2:
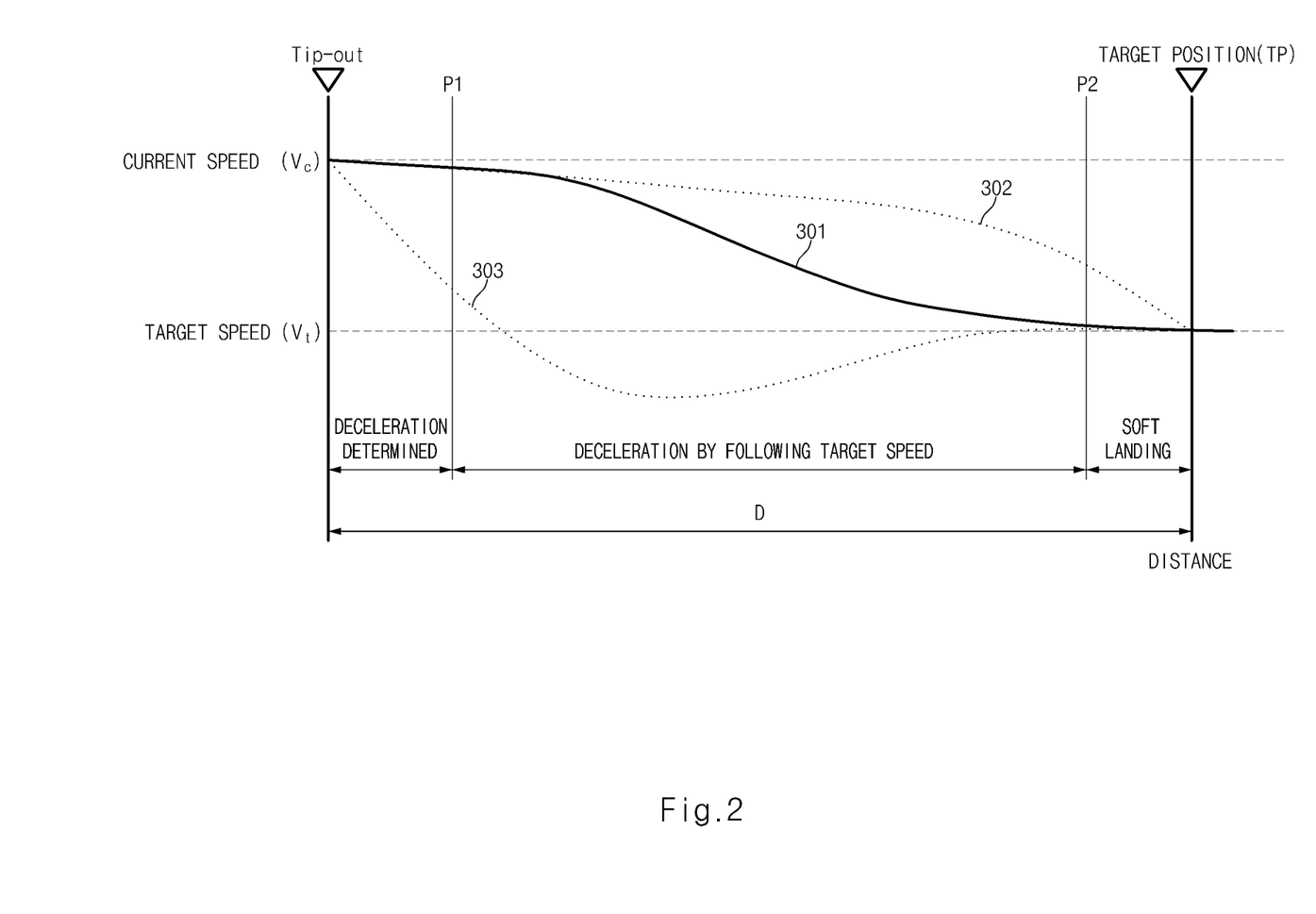
FIG. 2 is a view exemplarily illustrating a speed variation for each position of a vehicle, according to various exemplary embodiments of the present invention.

FIG. 2 is a view exemplarily illustrating a speed variation for each position of a vehicle, according to various exemplary embodiments of the present invention.

The vehicle transmission controlling apparatus 100 performs downshift to follow the target speed after deceleration intension is determined in the accel OFF (Tip-out). Accordingly, the vehicle transmission controlling apparatus 100 may follow the target speed for soft landing before the target position (TP). Accordingly, when an ideal speed profile is applied, the sense of incompatibility may be minimized as control logic is involved between an initial stage and a final stage of the deceleration control.

When sudden deceleration is performed before the target position due to the small degree of the deceleration control at the initial stage as in reference numeral 302 of FIG. 2, the speed of the vehicle 10 becomes lower than the target speed, so acceleration is frequently performed, which makes it difficult to maintain the target speed at the target position.

Furthermore, the target speed is followed after excessive deceleration in driving on a road continuously having an uphill and a downhill, which causes frequent re-acceleration due to the excessive deceleration at the initial stage of the deceleration control.

Accordingly, the vehicle transmission controlling apparatus 100 may sub-divide a distance between a current position and the target position into a plurality of sections, based on a position of a target, such as a speed camera or a front vehicle, for the deceleration control, and information on a vehicle speed, may determine a target speed for each sub-divided section and a target distance of the section, and may determine a gearshifting stage based on the target speed for the section and the target distance for the section. Accordingly, the transmission may be controlled based on an ideal speed profile as in reference numeral 301 of FIG. 2.

Accordingly, the detailed components of the vehicle transmission controlling apparatus 100 will be described with reference to an exemplary embodiment of FIG. 3.

Figure 3:
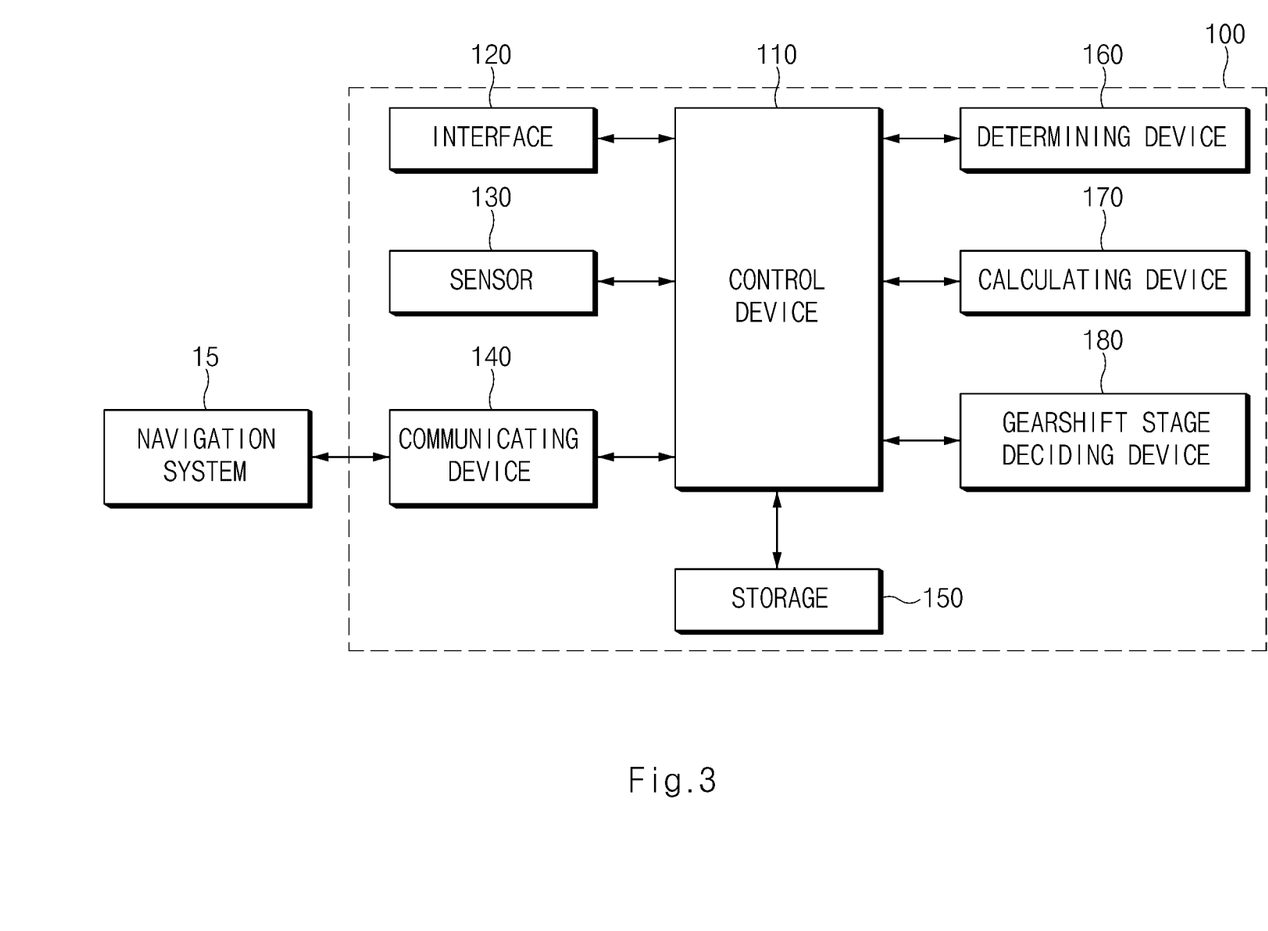
FIG. 3 is a view exemplarily illustrating the configuration of an apparatus of controlling a transmission of a vehicle, according to various exemplary embodiments of the present invention.

FIG. 3 is a view exemplarily illustrating the configuration of a vehicle transmission controlling apparatus, according to various exemplary embodiments of the present invention.

The vehicle transmission controlling apparatus 100 receives a road map from the navigation system 15. In the instant case, the road map may include the detailed information on each road. For example, the road map may include information on a speed camera placed on the road and information on the gradient of the road. The navigation system 15 may extract road information to a specific section of a front road from the current position of the vehicle 1, in a response to a request of the vehicle transmission controlling apparatus 100 and may provide the road information to the vehicle transmission controlling apparatus 100.

According to various exemplary embodiments of the present invention, the navigation system 15 and the vehicle transmission controlling apparatus 100 may be implemented inside the vehicle. In the instant case, the navigation system 15 and the vehicle transmission controlling apparatus 100 are linked to control units inside the vehicle 1 for operation.

Referring to FIG. 3, the vehicle transmission controlling apparatus 100 may include a control device 110, an interface 120, a sensor 130, a communicating device 140, a storage 150, a determining device 160, a calculating device 170, and a gearshifting stage deciding device 180. In the instant case, according to the exemplary embodiment of the present invention, at least one of the control device 110, the determining device 160, the calculating device 170, or the gearshifting stage deciding device 180 in the apparatus 100 may be implemented with at least one processor. In the instant case, the control device 110 may be implemented in a form of including the determining device 160, the calculating device 170, and the gearshifting stage deciding device 180.

The controller 110 may process signals transmitted between the components of the vehicle transmission controlling apparatus 100.

The interface 120 may include an input device to receive a control command from a user and an output device to output the operation state and the operation result of the apparatus 100.

In the instant case, the input device may include a key button, and may include a mouse, a joystick, a jog shuttle, a stylus pen, or the like. Furthermore, the input device may include a soft key implemented on a display.

An output device may include a display. In the case that a touch sensor, such as a touch film, a touch sheet, or a touch pad, is included in the display, the display may operate as a touch screen, and the input device and the output device may be implemented in the integral form.

In the instant case, the display may include at least one of a liquid crystal display (LCD), a thin film transistor-liquid crystal display (TFT LCD), an organic light-emitting diode (OLED), a flexible display, a field emission display (FED), or a three dimensional display (3D display).

The sensor 130 may include at least one sensor to detect an obstacle around the vehicle 10, for example, the target, such as the speed camera or the front camera, for deceleration control, and to measure a limit speed of the speed camera, a relative speed of the front camera, or the relative distance to the speed camera or the front camera. For example, the sensor 130 may include a radar, an ultrasonic sensor, a scanner, and/or a camera. Furthermore, various sensors may be employed as long as the sensors may detect an obstacle and measure a distance. Meanwhile, the sensor 130 may further include a sensor to measure the speed and/or the acceleration of the vehicle 1.

The communication device 140 may include a communication module to communicate with electronic parts and/or control units provided in the vehicle. For example, the communication module may be communicated to the navigation system 15 provided in the vehicle 10 to receive, from the navigation system 15, the information on the position of the vehicle 10 and/or the information on the state of the front road of the vehicle 10.

In the instant case, the vehicle network communication technology may include a controller area network (CAN) communication technology, a local interconnect network (LIN) communication technology, or a FlexRay communication technology. In the instant case, the communication device 140 may further include a module for wireless Internet access or a module for short range communication.

The wireless Internet technology may include a wireless LAN (WLAN), a wireless broadband (Wibro), a Wi-Fi, Worldwide Interoperability for Microwave Access (WiMAX). The short range communication technology may include Bluetooth, ZigBee, ultra wideband (UWB), radio frequency identification (RFID), or infrared data association (IrDA).

The storage 150 may store data and/or algorithms necessary for the apparatus 100 for controlling the transmission of the vehicle to operate.

For example, the storage 150 may store the information on the position of the vehicle 1 and/or the information on the state of the front road of the vehicle 10, which is received through the navigation system 15. For example, the storage 150 may store information on a curvature or a gradient, or information on a speed camera. Furthermore, the storage 150 may store information on the front vehicle, which is detected by the sensor 130. The storage 150 may store a command and/or an algorithm to determine a target speed for each section to a target position, and a target position for each section of the plurality of sections, based on the information on the position of the vehicle 1, or information (e.g., a position or a speed) on a target, such as a front vehicle or a speed camera, for deceleration control, to determine the final gearshifting stage based on the deceleration profile for each section to control the transmission.

In the instant case, the storage 150 may include a storage medium, such as a random access memory (RAM), a static random access memory (SRAM), a read only memory (ROM), a programmable read-only memory (PROM), an electrically erasable programmable read-memory, or the like.

The determining device 160 may determine whether the accelerator and the brake of the vehicle 1 is switched to be in an OFF state, and may determine whether to control transmission control based on the deceleration profile, depending on a current speed of the vehicle 1, when the accelerator and the brake of the vehicle 1 is switched to be in the OFF state, and when it is determined that the target, such as the front vehicle or the speed camera, for deceleration control is present on the front road, depending on the collected information on the front road.

For example, the determining device 160 determines whether a speed ($V_c$) of the vehicle 1 is greater than the minimum reference speed ($V_{min}$) and less than the maximum reference speed ($V_{max}$), and determines to control the transmission when the speed ($V_c$) of the vehicle 1 is greater than the minimum reference speed (Venin) and less than the maximum reference speed ($V_{max}$).

Figure 4:
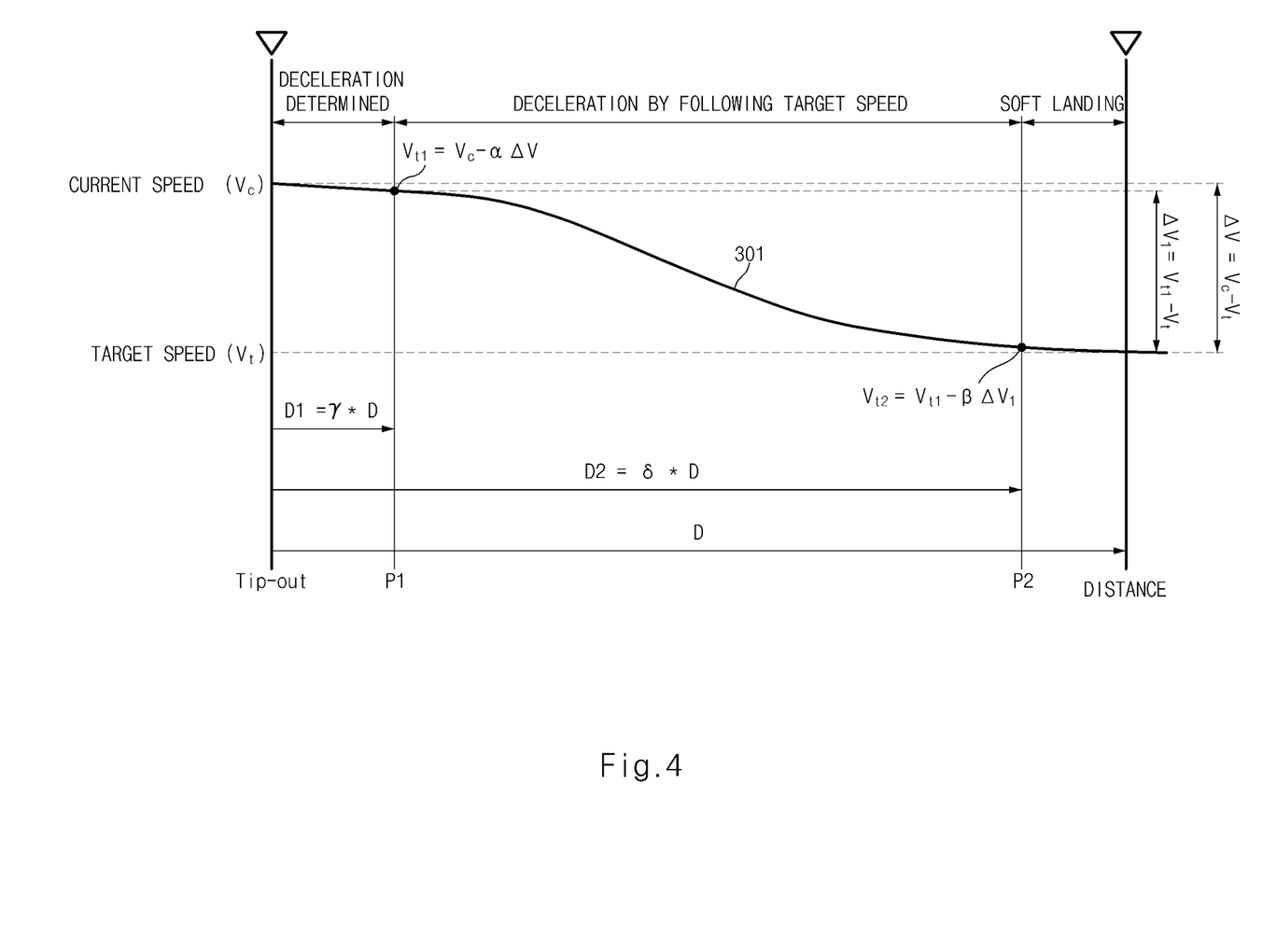
FIG. 4 is a view exemplarily illustrating a reference to explain an operation of determining a target position for each section in an apparatus of controlling a transmission of a vehicle, according to various exemplary embodiments of the present invention.

Accordingly, the calculating device 170 sub-divides the distance from the current position to the target position (TP) into sections and determines the target distance (D1 or D2) for each section of the plurality of sections and the target speed ($V_{t1}$ or $V_{t2}$) for each section of the plurality of sections, as illustrated in FIG. 4, when it is determined to control the transmission based on the deceleration profile, as the determination of the determining device 160. FIG. 4 is a view exemplarily illustrating a reference to explain an operation of determining a target position for each section in a vehicle transmission controlling apparatus, according to various exemplary embodiments of the present invention.

In other words, the calculating device 170 may sub-divide the distance from the current position of the vehicle to the target for the deceleration control into a plurality of sections by applying a preset ratio to the distance. The determining device 160 may determine whether the vehicle passes through each of the plurality of sections.

The calculating device 170 may determine a first target speed at a point through which the vehicle passes through a first section of the plurality of sections, may determine a second target speed at a point through which the vehicle passes through a second section adjacent to the first section, and may determine the final target speed at the position of the target for the deceleration control. In other words, the calculating device 170 may determine a first target speed ($V_{t1}$) at a point P1 using a current speed ($V_c$) of a host vehicle and a speed variation between the current speed ($V_c$) of the host vehicle and the final target speed, and may determine a second target speed ($V_{t2}$) at a point P2 by use of the first target speed ($V_{t1}$) at the point P1 and the speed variation between the first target speed ($V_{t1}$) at the point P1 and the final target speed. In the instant case, the calculating device 170 may determine the final target speed based on the speed (e.g., the speed of the front vehicle and the limit speed of the speed camera) of the target for deceleration control and the position of the target for the deceleration control when the deceleration control is performed.

The calculating device 170 may determine the first target speed ($V_{t1}$) the point P1 and may determine the second target speed ($V_{t2}$) at the point P2 as in following Equation 1.

$$V_{t1} = V_c - \alpha \Delta V$$

$$V_{t2} = V_{t1} - \beta \Delta V_1$$

$$\Delta V = V_c - V_t$$

$$\Delta V_1 = V_{t1} - V_t \quad \text{Equation 1}$$

In Equation 1, $\alpha$ and $\beta$ denote speed coefficients, which are previously set based on experimental values. For example, $\alpha$ may be set to be in the range of 0 to 0.1, and $\beta$ may be set to be in the range of 0.96 to 1.0, but the present invention is not limited thereto.

Furthermore, $\Delta V$ denotes the variation between the speed ($V_c$) and the final target speed ($V_t$), and $\Delta V1$ denotes the variation between the first target speed ($V_{t1}$) at the point P1 and the final target speed ($V_t$).

The calculating device 170 may determine the first target speed ($V_{t1}$) at the point P1 by subtracting a value, which is obtained by multiplying the variation ($\Delta V$) between the speed ($V_c$) of the host vehicle and the final target speed ($V_t$) by the speed coefficient ($\alpha$), from the current speed ($V_c$) of the host vehicle.

The calculating device 170 may determine the target speed ($V_{t2}$) at the point P2 by subtracting a value, which is obtained by multiplying the variation ($\Delta V_1$) between the target speed ($V_{t1}$) at the point P1 and the final target speed ($V_t$) by the speed coefficient ($\beta$), from the target speed ($V_{t1}$) at the point ($t_1$).

The calculating device 170 sub-divides the distance between the current position and the final target position TP based on the point P1 and the point P2 to determine the section between the current position and the point P1 as being the first section, the section between the point P1 and the point P2 as being the second section, the distance (first target distance; D1) of the first section as being 'D1', and the distance (second target distance; D2) of the second section as being 'D2' for determination. The calculating device 170 may determine the distances (D1 and D2) as in following Equation 2.

$$D1 = \gamma * D$$

$$D2 = \delta * D \quad \text{Equation 2}$$

In Equation 2, $\gamma$ and $\delta$ may denote distance coefficients and may be previously set through experimental values. For example, $\gamma$ may be in the range of 0 to 0.2, and $\delta$ may be set in the range of 0.7 to 0.8.

The first target distance (D1) is obtained by multiplying the total distance (D) to the final target position by the distance coefficient ($\gamma$), and the second target distance (D2) is obtained by multiplying the total distance (D) to the final target position by the distance coefficient ($\delta$). In other words, the total distance D is sub-divided at preset ratios to determine the distances (D1 and D2).

The gearshifting stage deciding device 180 may select a first gearshifting stage satisfying the target speed ($V_{t1}$) at the point P1, which is the first target position, based on the first target distance (D1), and may select the second gearshifting stage satisfying the target speed ($V_{t2}$) at the point, which is a second target position, based on the second target distance (D2). In other words, the gearshifting stage deciding device 180 may determine, as the first section gearshifting stage, a gearshifting stage to converge the first target speed at a position for the entrance into the first section in the deceleration profile for each gearshifting stage.

Thereafter, the gearshifting stage deciding device 180 may control the transmission to be at the first gearshifting stage when the vehicle 1 arrives at the first target position (P1) and may control the transmission to be at the second gearshifting stage when the vehicle 1 arrives at the second target position P2. The gearshifting stage deciding device 180 may determine, as a second section gearshifting stage, a gearshifting stage to converge the second target speed at the point P2, when the vehicle 1 passes through the second section in the deceleration profile for each gearshifting stage, after passing through the first section.

Furthermore, the gearshifting stage deciding device 180 may determine, as the final gearshifting stage, a gearshifting stage to converge the final target speed at the position of the target for the deceleration control in the deceleration profile for each gearshifting stage, after passing through the second section.

The gearshifting stage deciding device 180 may configure the deceleration profile for each gearshifting stage based on the target speed for each section of the plurality of sections and the target distance for each section of the plurality of sections, which are determined by the calculating device 170, and may determine the gearshifting stage for each section of the plurality of sections, which converges the target speed for each section at the target position for each section.

The deceleration profile for each section may be configured using following Equation 3.

$$V_i(t)=A_i t^2+(B_i-g \sin \theta)t+v_0 \qquad \text{Equation 3}$$

In Equation 3, 'A' denotes a second coefficient for curve fitting, 'B' denotes a primary coefficient for curve fitting, 'i' denotes a gearshifting stage, 'g' denotes gravity, 'θ' denotes a gradient, and 'v0' denotes an initial (current) vehicle speed.

Figure 5:
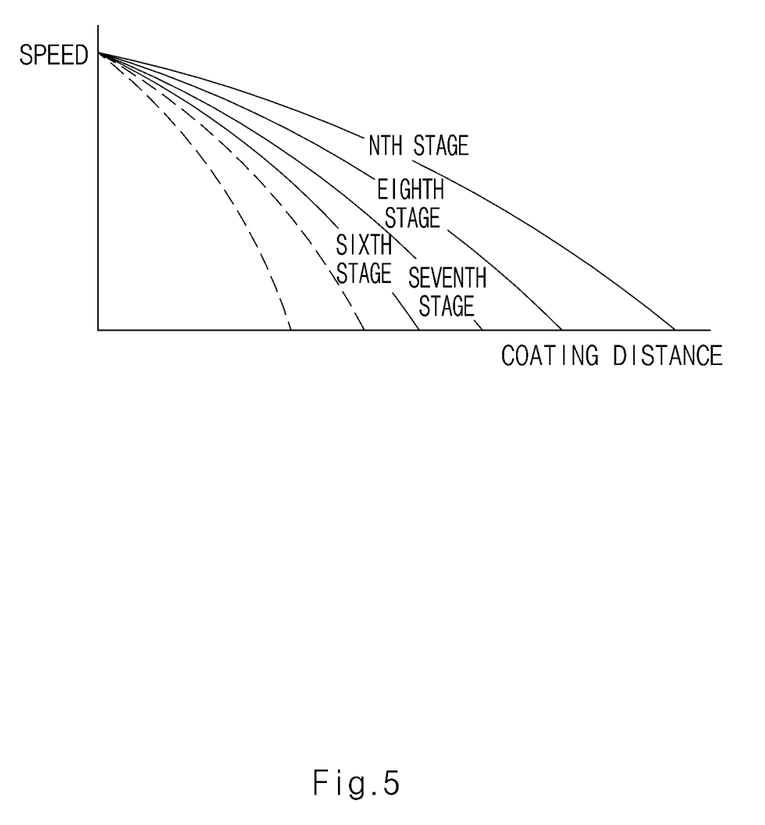
FIG. 5 is a view exemplarily illustrating a deceleration profile, according to various exemplary embodiments of the present invention.

The exemplary embodiment for the deceleration profile for each gearshifting stage, which is configured using Equation 3, will be understood with reference to FIG. 5. FIG. 5 is a view exemplarily illustrating the deceleration profile according to various exemplary embodiments of the present invention.

Figure 6:
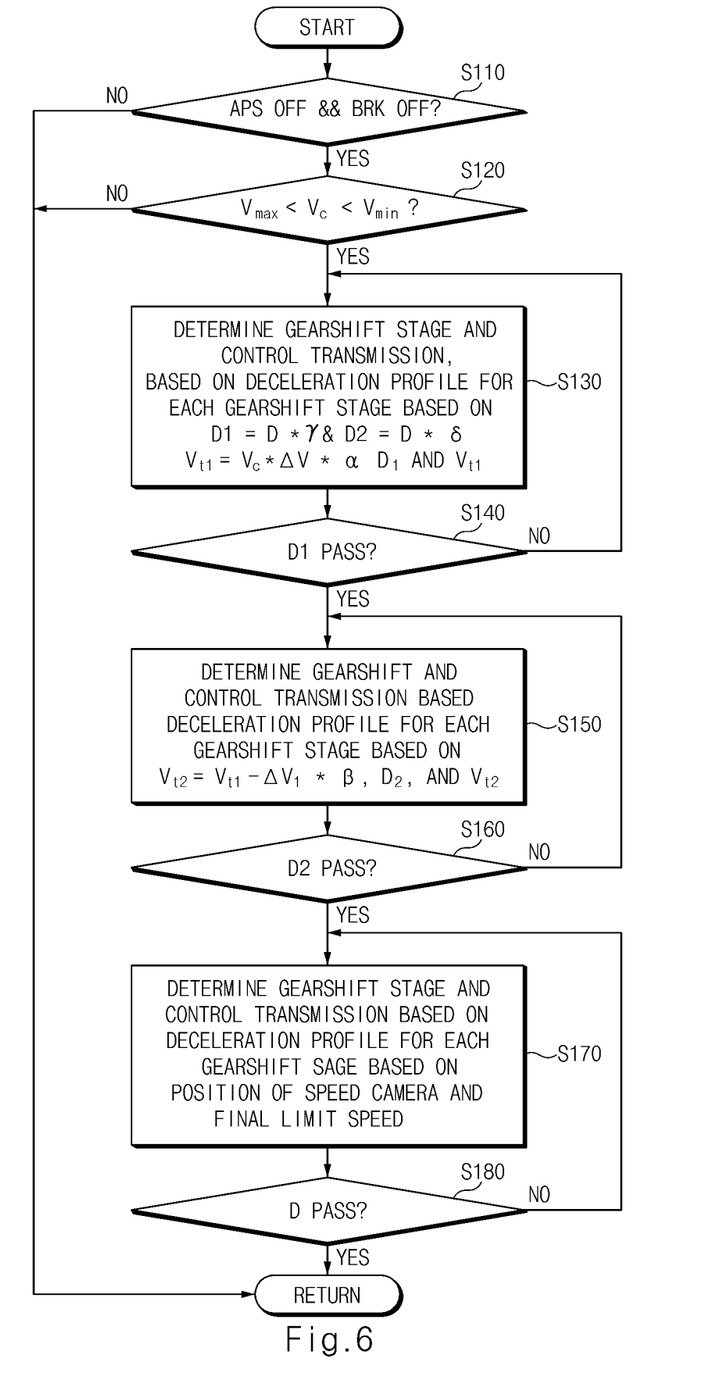
FIG. 6 is a view exemplarily illustrating an operating flow for a method for controlling a transmission of a vehicle, according to various exemplary embodiments of the present invention.

The gearshifting stage deciding device 180 may determine the first gearshifting stage to converge the first target speed ($V_{t1}$) at the first target position (P1), may determine the second gearshifting stage to converge the second target speed ($V_{t2}$) at the second target position (P2), and may determine the final gearshifting stage to converge the final target speed ($V_t$) at the final target position (PT), based on the deceleration profile for each gearshifting stage according to the exemplary embodiment of FIG. 6

According to the exemplary embodiment of the present invention, the apparatus 100 having the above operation may be implemented in a form of an independent hardware device including a memory and a processor to process each operation, and may be run in the form included in another hardware device such as a microprocessor or a general purpose computer system.

Hereinafter, the flowchart of the operation of the vehicle transmission controlling apparatus according to various exemplary embodiments of the present invention will be described in more detail.

FIG. 6 is a view exemplarily illustrating an operating flow for a method for controlling a transmission of a vehicle, according to various exemplary embodiments of the present invention. Hereinafter, it is assumed that the vehicle transmission controlling apparatus 100 of FIG. 1 performs a processor of FIG. 6. Furthermore, in the following description made with reference to FIG. 6, it may be understood that the operation referred to as being performed by apparatus 100 is controlled by the determining device 160, the calculating device 170, and the gearshifting stage deciding device 180 of the vehicle transmission controlling apparatus 100.

As illustrated in FIG. 6, the vehicle transmission controlling apparatus 100 starts coasting in an APS OFF state and a brake OFF state (S110).

Thereafter, when the front vehicle is present or the speed camera is present in front to require deceleration, the vehicle transmission controlling apparatus 100 detects the speed ($V_c$) of the vehicle 10 and determines whether the speed ($V_c$) exceeds the minimum reference speed ($V_{min}$) and is less than the maximum reference speed ($V_{max}$) (S120).

The vehicle transmission controlling apparatus 100 may determine to perform the deceleration control, when the speed ($V_c$) of the vehicle satisfies the condition that the speed ($V_c$) exceeds the minimum reference speed (Venin) and is less than the maximum reference speed ($V_{max}$).

The vehicle transmission controlling apparatus 100 subdivides the distance from the current position to the final target position, determines target distances D1 and D2 for sections, determines the target speed at the point P1 which is the first target position, determines a gearshifting stage by applying the first target distance (D1), the first target speed ($V_{t1}$) to the deceleration profile for each gearshifting stage, and controls the transmission depending on the gearshifting stage determined for driving at the first target speed when the vehicle arrives at the first target position P1 (S130).

For example, the distance between the current position and the final target position may be sub-divided into three sections, and the number of sections is not limited thereto. In other words, the distance may be sub-divided into more many sections if necessary.

The vehicle transmission controlling apparatus 100 determines the distances (D1 and D2) through Equation 2, when the target distance to the first target position (P1) is 'D1' and the target distance to the second target position (P2) is 'D2' in the total target distance.

Thereafter, the vehicle transmission controlling apparatus 100 determines whether the vehicle passes through the first target distance (D1) at the point P1 (S140), and determines a gearshifting stage by applying the second target speed ($V_{t2}$) and the second target distance (D2) at the point P2 in the second section to the deceleration profile for each gearshift, when the vehicle passes through the first target distance (D1) and controls the transmission depending on the determined gearshifting stage such that the vehicle runs at the second target speed when arriving at the second target position (P2) (S150).

Thereafter, the vehicle transmission controlling apparatus 100 determines whether the vehicle passes through the second target distance (D2 at the point P2) (S160), determines a gearshifting stage by applying the position (the final target position (TP)) of the speed camera and the final limit speed (the final target speed ($V_t$) to the deceleration profile for each gearshifting stage, and controls the transmission depending on the determined gearshifting such that the vehicle runs at the final target speed ($V_t$) when arriving at the final target position (TP) (S170).

Thereafter, the vehicle transmission controlling apparatus 100 determines whether the vehicle passes through the final target distance D (at the point PT) (S180) and terminates the deceleration control when the vehicle passes through the final target distance.

As described above, according to various exemplary embodiments of the present invention, when the speed is controlled to follow the target speed at the final target position, the section between the current position to the final target position is sub-divided and the transmission is controlled based on the speed profile, more finely performing the transmission control when comparing with the transmission control only based on the final target position. Accordingly, the ideal transmission control based on the speed profile is possible.

Figure 7:
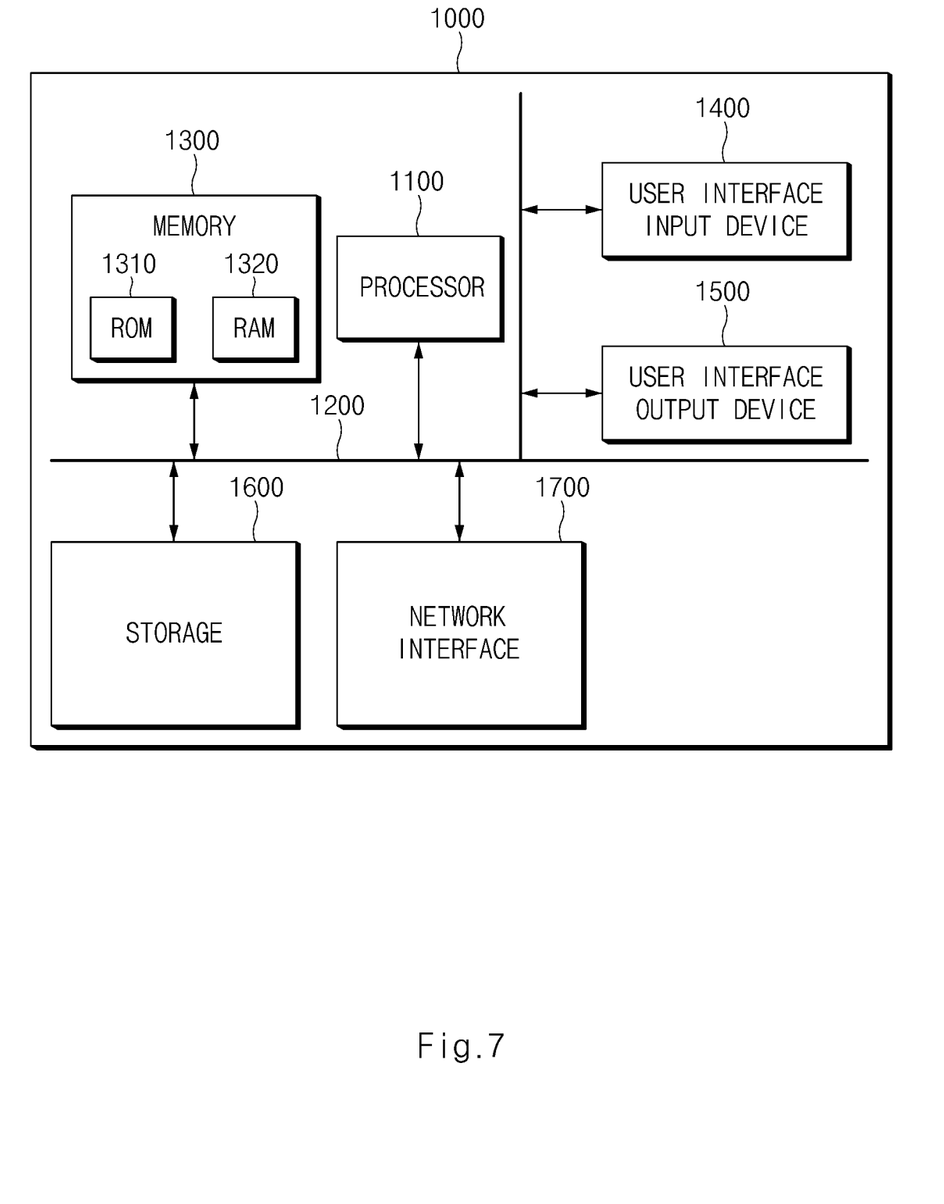
FIG. 7 is a block diagram illustrating a computing system to execute the method according to various exemplary embodiments of the present invention.

FIG. 7 is a block diagram illustrating a determining system to execute the method according to various exemplary embodiments of the present invention.

Referring to FIG. 7, a computing system 1000 may include at least one processor 1100, a memory 1300, a user interface input device 1400, a user interface output device

1500, a storage 1600, and a network interface 1700, which are connected to each other via a bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM; see 1320).

Thus, the operations of the methods or algorithms described in connection with the exemplary embodiments included in various exemplary embodiments of the present invention may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and the storage medium may reside as separate components of the terminal of the user.

According to various exemplary embodiments of the present invention, the distance between the current position and the target position may be sub-divided into the plurality of sections, the target position for each section of the plurality of sections and the target speed for each section may be determined, and the transmission may be controlled based on the speed profile resulting from the determination result Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a transmission of a vehicle, the apparatus comprising:
    a determining device configured to determine whether to perform deceleration control, based on the vehicle and a target for the deceleration control in front of the vehicle, upon determining that coasting of the vehicle is started;
    a calculating device configured to sub-divide a distance between a current position of the vehicle and the target for the deceleration control into a plurality of sections, and to determine a target distance for each section of the plurality of sections and a target speed of each section, according to a current speed of the vehicle and the distance between the current position of the vehicle and the target for the deceleration control, when the deceleration control is determined to be performed;
    a gearshifting stage deciding device configured to determine a gearshifting stage for each section of the plurality of sections, according to the determined target speed for each section and the determined target distance for each section of the plurality of sections by configuring a deceleration profile for each gearshifting stage; and
    a control device connected to the determining device, the calculating device and gearshifting stage deciding device and configured to control the transmission for each section according to the gearshifting stage for each section.

2. The apparatus of claim 1, wherein the determining device is configured to determine to perform the deceleration control upon determining that the current speed of the vehicle satisfies a reference condition.

3. The apparatus of claim 1, wherein the calculating device is configured to sub-divide the distance between the current position of the vehicle and the target for the deceleration control into the plurality of sections, by applying a preset ratio to the distance.

4. The apparatus of claim 1,
    wherein the plurality of sections includes a first section and a second section,
    wherein the target speed includes a first target speed, a second target speed and a final target speed, and
    wherein the calculating device is configured to determine the first target speed at a point through which the vehicle passes through the first section, to determine the second target speed at a point through which the vehicle passes through the second section adjacent to the first section, and to determine the final target speed at a position of the target for the deceleration control.

5. The apparatus of claim 4, wherein the calculating device is configured to determine the first target speed according to a speed variation between the current speed of the vehicle and the final target speed, and the current speed of the vehicle.

6. The apparatus of claim 4, wherein the calculating device is configured to determine the second target speed according to a speed variation between the first target speed and the final target speed, and the first target speed.

7. The apparatus of claim 4, wherein the determining device is configured to determine whether the vehicle passes through each of the plurality of sections.

8. The apparatus of claim 4, wherein the gearshifting stage deciding device is configured to determine, as a first section gearshifting stage, a gearshifting stage to converge the first target speed at a position upon determining that the vehicle passes through the first section, in the deceleration profile for each gearshifting stage.

9. The apparatus of claim 8, wherein the gearshifting stage deciding device is configured to determine, as a second section gearshifting stage, a gearshifting stage to converge the second target speed at a position upon determining that the vehicle passes through the second section, in the deceleration profile for each gearshifting stage, after the vehicle passes through the first section.

10. The apparatus of claim 4, wherein the calculating device is configured to determine the final target speed according to a speed of the target for the deceleration control and a position of the target for the deceleration control, upon determining that the deceleration control is performed.

11. The apparatus of claim 1, further including:
a sensor configured to collect information on the target for the deceleration control.

12. A method of controlling a transmission of a vehicle, the method comprising:
determining, by a control device, whether to perform deceleration control, based on the vehicle and a target for the deceleration control in front of the vehicle, upon determining that coasting of the vehicle is started;
sub-dividing, by the control device, a distance between a current position of the vehicle and the target for the deceleration control into a plurality of sections, and determining a target distance for each section of the plurality of sections and a target speed of each section, according to a current speed of the vehicle and the distance between the current position of the vehicle and the target for the deceleration control, when the deceleration control is determined to be performed;
determining, by the control device, a gearshifting stage for each section of the plurality of sections, according to the determined target speed for each section and the determined target distance for each section by configuring a deceleration profile for each gearshifting stage; and
controlling, by the control device, the transmission for each section of the plurality of sections according to the gearshifting stage for each section.

13. The method of claim 12, wherein the determining of whether to perform the deceleration control includes:
determining to perform the deceleration control upon determining that the current speed of the vehicle satisfies a reference condition.

14. The method of claim 12, wherein the determining of the target distance for each section of the plurality of sections and the target speed of each section includes:
sub-dividing the distance between the current position of the vehicle and the target for the deceleration control into the plurality of sections, by applying a preset ratio to the distance.

15. The method of claim 14,
wherein the plurality of sections includes a first section and a second section,
wherein the target speed includes a first target speed, a second target speed and a final target speed, and
wherein the determining of the target distance for each section of the plurality of sections and the target speed of each section includes:

determining the first target speed at a point through which the vehicle passes through the first section, determining the second target speed at a point through which the vehicle passes through the second section adjacent to the first section, and determining the final target speed at a position of the target for the deceleration control.

16. The method of claim 15, wherein the determining of the final target speed includes:
determining the first target speed according to a speed variation between the current speed of the vehicle and the final target speed, and the current speed of the vehicle; and
determining the second target speed according to a speed variation between the first target speed and the final target speed, and the first target speed.

17. The method of claim 16, wherein the determining of the gearshifting stage for each section includes:
determining, as a first section gearshifting stage, a gearshifting stage to converge the first target speed at a position upon determining that the vehicle passes through the first section, in the deceleration profile for each gearshifting stage.

18. The method of claim 17, wherein the determining of the gearshifting stage for each section further includes
determining, as a second section gearshifting stage, a gearshifting stage to converge the second target speed at a position upon determining that the vehicle passes through the second section, in the deceleration profile for each gearshifting stage, after the vehicle passes through the first section.

19. The method of claim 18, wherein the determining of the gearshifting stage for each section further includes
determining, as a final gearshifting stage, a gearshifting stage to converge the final target speed at the position of the target for the deceleration control, in the deceleration profile for each gearshifting stage, after the vehicle passes through the second section.

20. A vehicle system comprising:
a navigation system configured to provide information on a road; and
a vehicle transmission controlling apparatus of a vehicle and of being configured to:
sub-divide a distance between a current position of the vehicle and a target for a deceleration control into a plurality of sections, upon determining that the target for the deceleration control is confirmed as being present on a front road by the navigation system,
determine a target distance for each section of the plurality of sections and a target speed for each section of the plurality of sections according to a current speed of the vehicle and the distance between the current position of the vehicle and the target for the deceleration control,
determine a gearshifting stage for each section of the plurality of sections, according to the determined target speed for each section of the plurality of sections and the determined target distance for each section of the plurality of sections by configuring a deceleration profile for each gearshifting stage, and
control a transmission of the vehicle according to the determined gearshifting stage.

* * * * *